Aug. 4, 1936.   J. G. C. MANTLE   2,050,229
METHOD OF AND APPARATUS FOR MAKING TUBULAR WALLS
Original Filed July 18, 1924   2 Sheets—Sheet 1
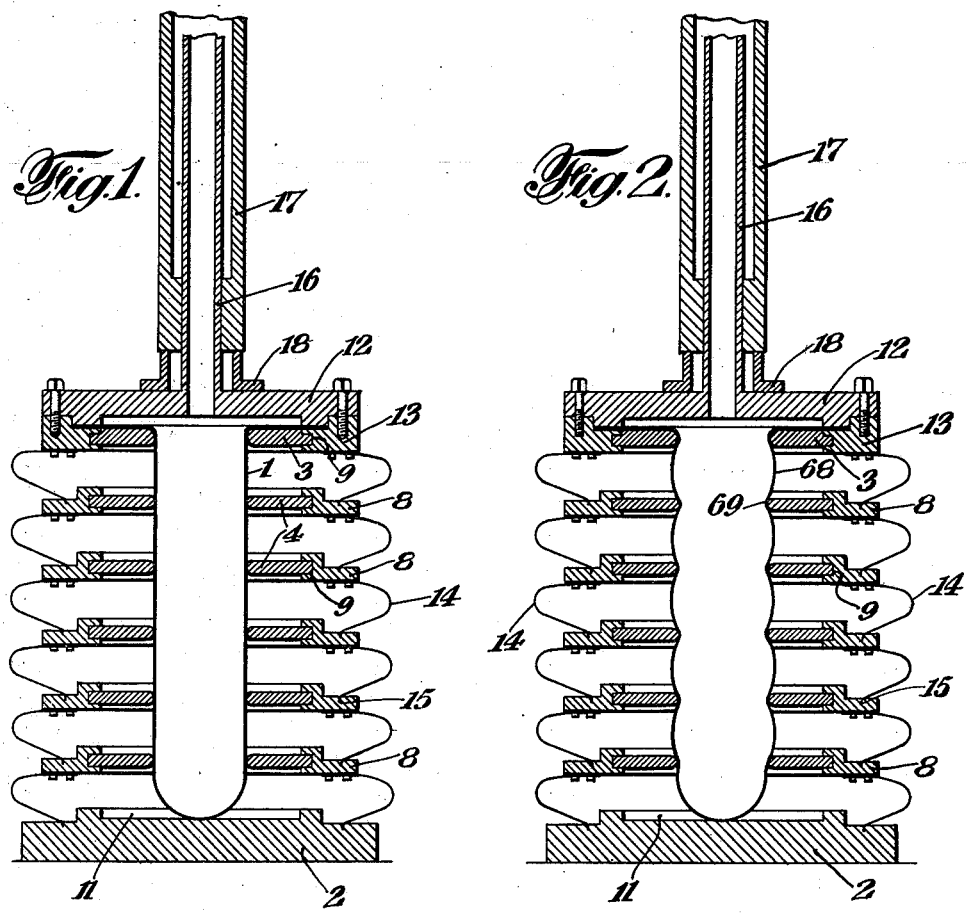
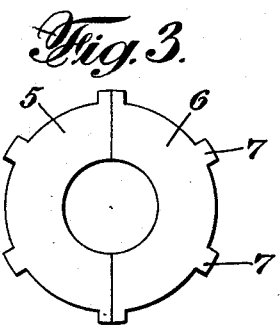
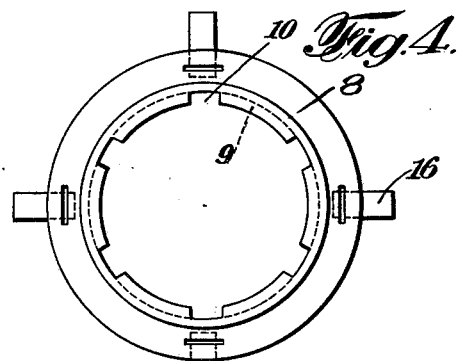
INVENTOR
Joseph G.C. Mantle
BY
Prindle, Bean & Mann
ATTORNEY Aug. 4, 1936.  J. G. C. MANTLE  2,050,229
METHOD OF AND APPARATUS FOR MAKING TUBULAR WALLS
Original Filed July 18, 1924  2 Sheets-Sheet 2
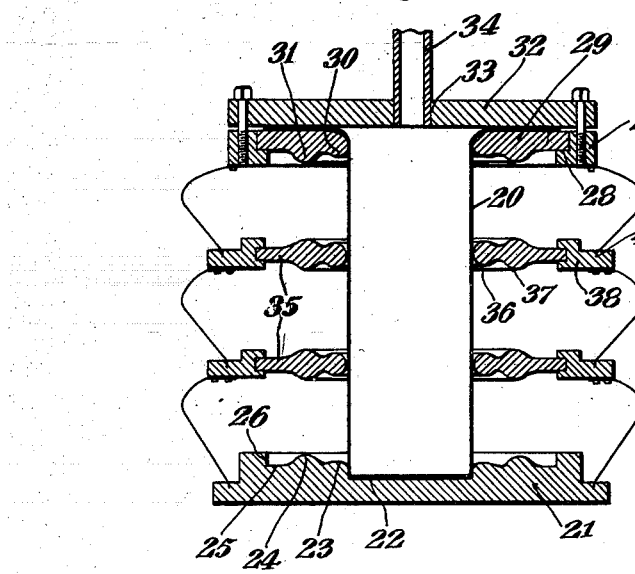
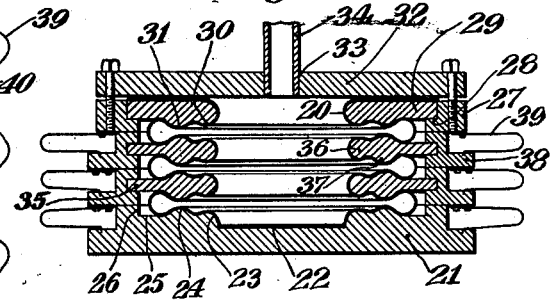
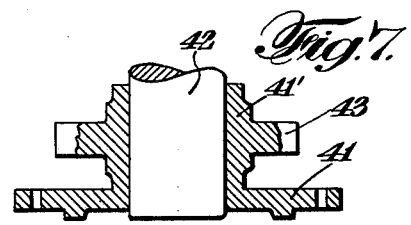
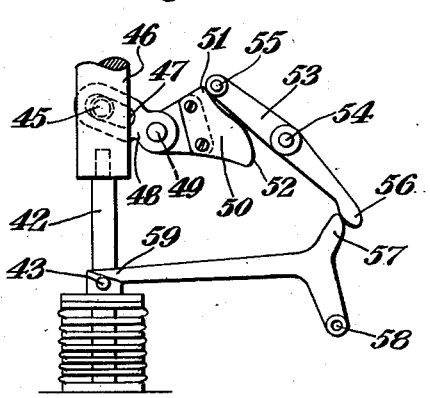
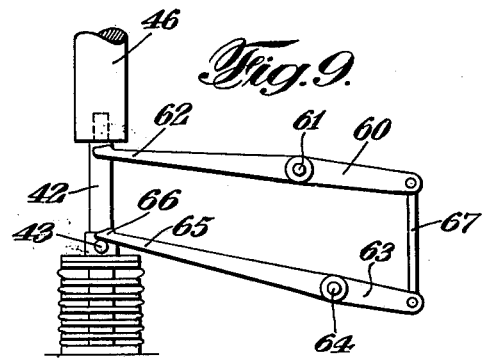
INVENTOR
Joseph G. C. Mantle
BY
Prindle, Bean & Mann
ATTORNEY Patented Aug. 4, 1936

2,050,229

UNITED STATES PATENT OFFICE 2,050,229

METHOD OF AND APPARATUS FOR MAKING TUBULAR WALLS

Joseph G. C. Mantle, Leonia, N. J., assignor, by mesne assignments, to Bridgeport Thermostat Company, Inc., Bridgeport, Conn., a corporation of Delaware Original application July 18, 1924, Serial No. 726,671. Divided and this application July 26, 1930, Serial No. 470,830. In Canada March 6, 1930

9 Claims. (Cl. 153—73)

This invention relates to a method of and apparatus for making tubular walls from shells or tubes of ductile material. The shells or tubes may be drawn from sheet material and may be flanged or plain.

An object of this invention is to rapidly and economically transform the shells or tubes into such shapes which, in general, could only hitherto be done by repeated annealing and operations or by first forming portions and then joining them together to form the whole. By my invention, a large number of shapes may be obtained in a single operation which the limited ductility of the material comprising the shell or tube would otherwise have rendered impossible.

Another object of this invention is the provision of a method for producing an expansible and contractible shell or tube having additional corrugations in the folds thereof.

A further object of this invention is the provision of a holder for securely holding a mold part therein.

Other objects and advantages of the invention will be in part obvious and in part specifically pointed out in the description hereinafter contained which, taken in conjunction with the accompanying drawings, discloses a method and apparatus adapted to be operated in accordance with the invention.

In the drawings—

Figure 1 represents a vertical section of a contractible mold with a flanged shell or tube therein at the beginning of the operation.

Figure 2 represents a vertical section of a contractible mold with a flanged shell or tube at the end of the first stage of the operation.

Figures 3 and 4 are separate plan views of the parts of the contractible mold shown in Figures 1 and 2.

Figure 5 represents a vertical section of a contractible mold with a flanged shell therein at the beginning of the operation, the contractible mold being formed of mold parts provided with projections on their faces intermediate their ends.

Figure 6 shows the contractible mold of Figure 5 at the end of the operation.

Figure 7 represents a vertical cross section of a modified form of top plate adapted to receive the plunger to exert a pressure interiorly of the shell or tube.

Figures 8 and 9 diagrammatically represent two forms of a mechanism by which a punch-holder is adapted to collapse the contractible mold while applying internal fluid pressure.

Referring now to the drawings, the flanged shell or tube 1 is supported in a contractible mold comprising a bottom mold part 2, a separable top mold part 3, and intermediate separable mold parts 4. Each of the mold parts 3 and 4 comprises two complemental sections 5 and 6, as shown in Fig. 3, and each of the sections 5 and 6 is provided with a plurality of spaced lugs 7. As shown in Figure 3, sections 5 and 6 are divided along a line which also divides certain of the lugs 7 into two parts, but it is to be expressly understood that the line of division between these sections may be taken at any place. Each mold part 4 is supported and held together in an integral holder 8, each holder 8 being provided with an annular groove 9 adapted to receive the complemental sections 5 and 6 of the mold parts 4. Each holder 8 is also provided with spaced notches or cutaway portions 10 corresponding in position and number to lugs 7 on the sections 5 and 6, so that the sections may be placed within the annular groove 9 of the holder 8 and when given a slight twist or turn are securely held together and prevented from spreading apart during the operation.

The bottom mold part 2 is provided with a central depression or cutaway portion 11 upon which the closed end of the tube or shell 1 is adapted to rest.

The flange of the shell or tube 1 is clamped between the top plate 12 and the top holder 13, the two parts being securely held together by screws or other suitable means. The top mold part 3 comprises two complemental sections similar to the ones shown in Figure 3, the two sections being supported and held together in the top holder 13 by grooves and notches or cutaway portions similar to the ones shown in Figure 4. The top surface of the mold part 3 is flush with the top surface of the top holder 13 so as to form a continuous support for the flange of the shell or tube.

Top holder 13 and the intermediate holders 8 with mold parts 4, are held in spaced relation by the interposed curved leaf springs 14, one end of each spring being attached to the bottom portion of the holders, and the other or free end of the spring being adapted to fit into slots 15 provided in the upper surfaces of the holders 8 and the bottom mold part 2. These springs 14 are adapted to permit independent movement of each holder, and to sustain the holders in correct relation to each other, and also act as guides in preventing lateral movement of the holders.

The top plate 12 is provided with a pipe or tube 16 which telescopes into reservoir 17 containing fluid under pressure. Between the reservoir 17 and the top plate 12, is a removable stop piece 18.

Referring now to Figures 5 and 6, reference character 20 designates a flanged tube or shell, the whole assembly being similar to the assembly described in connection with Figure 1. The contractible mold of this embodiment is of a slightly different form from the contractible mold shown in the other embodiment. The bottom mold part 21 is provided with a central annular depression 22, and two annular rounded projections 23 and 24 which are concentric with the central depression. Surrounding the annular projection 24 is an annular groove 25 provided with a shoulder 26. The top holder 27 is provided with a flange or shoulder 28 which is adapted to receive the top mold part 29, the bottom portion of the mold part 29 being provided with two concentric, rounded, annular projections 30 and 31.

The top mold part 29 is formed of two complemental sections similar to the ones shown in Figure 3, but since this mold part merely rests on the shoulder 28 formed on the top holder 27, the lugs 7 shown in Fig. 3 are not necessary. The flange of the tube or shell 20 is clamped between the top mold part 29 and the top plate 32 by means of screws or other suitable means connecting the top plate 32 and the top holder 27. Top plate 32 is provided with an opening 33 which receives a pipe 34 for conducting fluid pressure to the interior of the shell or tube 20.

A plurality of mold parts 35 is provided between the top mold part 29 and the bottom mold part 21. Each of these mold parts 35 is provided with a plurality of annular, concentric, rounded projections 36 and 37, the outer projection being of a greater depth than the inner one. A holder 38 is provided for each separable mold part 35 and the interconnection of these parts is similar to the one shown in Fig. 1.

Top holder 27 and the intermediate holders 38 are held in spaced relation by the interposed curved, leaf springs 39, one end of each spring being attached to the bottom portion of the holders and the other or free end of each spring being adapted to fit into slots 40 provided in the upper surfaces of the holders 38 and the bottom mold part 21. These springs 39 function in a way similar to the springs 14 described in connection with Figures 1 and 2. When the contractible mold is collapsed, as shown in Fig. 6, it is apparent that a contractible and expansible member is formed in which the individual folds of the shell or tube are also provided with corrugations, and the tubular wall will take the shape shown in Fig. 6.

Fig. 7 shows a modified form of a top plate which may be substituted for either of the top plates 12 or 32 shown in Figures 1 and 5, respectively. Top plate 41 is provided with an upstanding sleeve 41' which receives the plunger 42. The sleeve 41' is provided with projections or lugs 43 which are adapted to be forced downwardly by the levers shown in connection with Figures 8 and 9.

Referring now to Figure 8, a stud and roller 45 carried by the punch-holder 46 engages the slot 47 in an arm of the lever 48 fulcrumed at 49. A cam member 50 is attached by screws or other suitable means to the other arm of lever 48. The cam member 50 is provided with an arcuate surface 51 at one end concentric with fulcrum 49 and a cam surface 52 on the rest of the curved surface on the cam member. The cam surface 52 is so formed as to permit the levers to move a greater distance than the plunger 42 so as not to increase the pressure in the collapsed tube to too great an extent due to the decrease in volume of the interior of the collapsed shell or tube. The lever 53 fulcrumed at 54 carries a roller 55 which engages the curved surface of cam member 50, and the end 56 of the lever 53 engages an arm of the lever 57 which is fulcrumed at 58. Lever 57 has a forked end 59 adapted to press downwardly on the lugs or projections 43 of the sleeve 41' on the top plate 41 for the purpose of compressing the contractible mold.

During the first part of the downward movement, the roller 55 is on the arcuate concentric part 51 of the cam member 50 and no movement is given to the lever 57, but the plunger 42 moves downwardly a short distance, sufficient to form preliminary bulges 68 in the tube or shell 1 with the resultant creasings 69. Further downward movement of the punch-holder 46 causes movement of the levers and when the punch-holder has reached its bottom position the contractible mold has been compressed to form the corrugated tube or wall. The roller 55 is then on the part of the cam surface of the cam member 52 which is farthest from the fulcrum 49, but it is to be noted that the end 59 of the lever 57 will move downwardly a greater distance than the plunger 42 due to the shape of the cam surface 52 on cam member 50.

Referring now to Figure 9, a lever 60 is fulcrumed at 61 and has a free arm 62 which is spaced a distance from the punch-holder 46 at the beginning of the operation, so that a slight movement of punch-holder 46 and plunger 42 is possible before lever 60 is moved. Another lever 63 is fulcrumed at 64 and has a free arm 65 provided with a forked end 66 which presses downwardly on lugs 43 on top plate 41. The outer ends of the levers 60 and 63 are connected by a link 67. It is to be noted that free arm 65 of lever 63 is longer than free arm 62 on lever 60, so that during the operation the forked end 66 of lever 63 travels a longer distance than the end of lever 60 and, consequently, the contractible mold is moved downwardly at a faster rate than the plunger 42.

A slight downward movement of the punch-holder 46 moves it into contact with the end of free arm 62, and brings the plunger 42 into position to form the bulgings 68, and the resultant creasings 69. Further movement of the punch-holder forces the end of free arm 62 downwardly and due to the interconnection of levers 60 and 63, the forked end 66 of lever 63 forces the lugs or projections 43 on top plate 41 downwardly to collapse the contractible mold and form the corrugated tube or shell. Due to the fact that free arm 65 of lever 63 is longer than free arm 62 of lever 60, the contractible mold is moved downwardly at a faster rate than the plunger 42, so that there is not too great a pressure in the collapsed tube due to the decrease in volume thereof during the latter part of the operation.

The operation of the invention will now be described. When the top plate shown in Figs. 1, 2, 5 and 6 is used, the shell or tube is placed in the contractible mold and the flange of the shell or tube is clamped between the top plate, the top holder 13 and the top mold part, as shown in Figs. 1 and 5. A preliminary pressure is exerted in the interior of the shell or tube and the preliminary bulges 68 and the resultant creasings 69 are formed as shown in Fig. 2. While the shell or tube is under sustained pressure, the top plate is forced downwardly to form a corrugated shell or tube.

The operation of the invention will now be described when the top plate 41 shown in Fig. 7, is substituted for the top plate shown in Figs. 1, 2, 5 and 6. The reference characters of Fig. 1 will be specifically referred to. The shell or tube 1 is filled with a liquid, usually water, and is then placed in the contractible mold, the curved leaf springs 14 functioning to keep the individual mold parts in correct spaced relation. The flange of the shell or tube 1 is clamped between the top mold part 3 in the top holder 13 and top plate 12. The punch-holder 46 is given a slight downward movement, and, due to the mechanism correlating the levers, no movement of the levers occurs, but the plunger 42 is forced downwardly a short distance. A small downward movement of the plunger causes an increase in pressure in the interior of the shell or tube 1 to form the preliminary bulges 68 and the resultant creasings 69, which creasings assist the springs in keeping the mold parts and holders in correct spaced position during the remainder of the operation. Further downward movement of the punch-holder 46 actuates the levers and the forked ends of the levers which rest on the lugs or projections 43 of the sleeve 41', to collapse the contractible mold to form the corrugated article. During the latter part of the operation the end 59 (Fig. 8) of lever 57 has moved a greater distance than the plunger 42 due to the shape of the cam surface previously described. The end 66 (Fig. 9) of lever 65 also moves a greater distance than the plunger due to the length of arm 65. This differential movement of the levers and plunger is necessary so as not to increase the pressure to too great an extent, since the volume of the tube has decreased due to the collapsing operation. To remove the finished article, it is only necessary to remove the top plate 41 and then individually remove the sections of the mold from the holders.

The shells or tubes which are to be operated on are not restricted to shells or tubes of a circular cross section. It is obvious that the contractible mold may have any desired transverse or longitudinal form. Furthermore, the corrugated tubes or shells formed by using my apparatus are not restricted to symmetrical shapes nor to uniform or concentric enlargements of the shell or tube.

This application is filed as a division of my pending application Ser. No. 726,671, filed July 18, 1924, entitled Method of and apparatus for making hollow articles.

What I claim is:

1. In an apparatus for making hollow articles from metal shells or tubes, the combination of means for collapsing the wall of the shell or tube, a contractible mold for surrounding the wall, said mold comprising a plurality of individual mold-parts, two of said mold-parts being adapted to form on the wall a hollow, outwardly extending, circumferential projection, the projection having a hollow, annular projection extending in the axial direction of the wall, and hydraulic means for outwardly expanding a portion of the wall into the said contractible mold during its contraction to form the circumferential projection along with the annular projection.

2. In an apparatus of the character described, a contractible mold including an integral grooved holder, mold parts adapted to be received by the groove in said holder, each mold part having a plurality of annular rounded projections on its surface.

3. A method of making expansible and contractible walls, which comprises mounting a shell or tube in a contractible mold inducing an initial pressure to form a preliminary bulge in the shell or tube, and then further expanding the wall of the shell or tube while collapsing the contractible mold and while restricting the movement of portions of the shell or tube to form folds and corrugations in the folds.

4. A method of making expansible and contractible walls which comprises mounting a shell or tube in a contractible mold including a plurality of mold parts, adjacent mold parts being provided with annular projections on their surfaces, inducing an initial pressure to form a preliminary bulge in the wall of the shell or tube, and collapsing the shell or tube while under sustained pressure and restraining or obstructing portions of the shell or tube by the annular projections on the mold parts to form an expansible and contractible article having corrugations in the folds thereof.

5. A method of making expansible and contractible walls, which comprises, mounting a shell or tube in a contractible mold including a plurality of mold parts, adjacent mold parts being provided with annular projections on their surfaces, forming a series of bulges in the wall of the shell or tube, and collapsing the shell or tube while under sustained pressure and restraining or obstructing portions of the shell or tube by the annular projections on the mold parts to form an expansible and contractible article having corrugations in the folds thereof.

6. A method of making expansible and contractible walls, which comprises, mounting a shell or tube in a contractible mold including mold parts, including an initial pressure to form a series of preliminary bulges in the wall of the shell or tube, and then further expanding the wall of the shell or tube while collapsing the contractible mold to simultaneously form outwardly extending circumferential folds having annular corrugations therein.

7. A method of making expansible and contractible walls, which comprises, mounting a shell or tube in a contractible mold including a plurality of mold parts, forming preliminary bulges in the wall of the shell or tube, and then further expanding the wall of the shell or tube while collapsing the contractible mold to simultaneously form outwardly extending circumferential folds having annular corrugations therein.

8. The method of making expansible and contractible walls, which comprises, mounting a shell or tube in a contractible mold including a plurality of mold parts, adjacent mold parts being provided with annular projections on their surfaces, forming a series of bulges in the wall of the shell or tube, and collapsing the shell or tube while under sustained pressure to form corrugations in the wall thereof and simultaneously restraining portions of the corrugations to form folds in the corrugations to produce a highly resilient member.

9. The method of making expansible and contractible walls, which comprises, mounting a shell or tube in a contractible mold including mold parts formed with projections on their surfaces, forming a series of bulges in the wall of the shell or tube, and then further expanding the wall of the shell or tube while collapsing the contractible mold to form corrugations in the wall of the shell or tube, and at the same time forms folds in the corrugations by restricting the collapse of portions of the shell or tube by the projections on the mold parts.

JOSEPH G. C. MANTLE.

CERTIFICATE OF CORRECTION.

Patent No. 2,050,229. August 4, 1936.

JOSEPH G. C. MANTLE.

It is hereby certified that error appears in the printed specification of the above numbered patent requiring correction as follows: Page 3, second column, line 47, claim 6, for "including" read inducing; and that the said Letters Patent should be read with this correction therein that the same may conform to the record of the case in the Patent Office.

Signed and sealed this 29th day of September, A. D. 1936.

Henry Van Arsdale (Seal) Acting Commissioner of Patents.